United States Patent [19]

Boeder et al.

[11] 4,407,071
[45] Oct. 4, 1983

[54] INTERNAL DIAMETER MEASURING DEVICE FOR PIPES

[75] Inventors: Dieter Boeder, Duesseldorf; Karl-Josef Wiemers, Bochum, both of Fed. Rep. of Germany

[73] Assignee: Rheinmetall GmbH, Duesseldorf, Fed. Rep. of Germany

[21] Appl. No.: 230,050

[22] Filed: Jan. 29, 1981

[30] Foreign Application Priority Data

Jan. 31, 1980 [DE] Fed. Rep. of Germany ....... 3003415

[51] Int. Cl.³ ............................. G01B 5/12; G01B 7/12
[52] U.S. Cl. ................................. 33/178 E; 33/178 F
[58] Field of Search .......... 33/178 E, 178 F, DIG. 13

[56] References Cited

U.S. PATENT DOCUMENTS

| | | | |
|---|---|---|---|
| 2,322,343 | 6/1943 | Brandon | 33/178 F |
| 2,607,128 | 8/1952 | Newhall | 33/DIG. 13 |
| 2,766,533 | 10/1956 | Brandon | 33/178 F |
| 3,803,518 | 4/1974 | Perthen | 33/178 F |
| 3,939,570 | 2/1976 | Loftus | 33/178 F |
| 4,021,925 | 5/1977 | Loftus | 33/178 F |
| 4,109,386 | 8/1978 | Kinley et al. | 33/DIG. 13 |
| 4,186,494 | 2/1980 | Edouard et al. | 33/DIG. 13 |
| 4,228,593 | 10/1980 | Frank et al. | 33/178 F |

FOREIGN PATENT DOCUMENTS 314062 9/1971 U.S.S.R. ............................ 33/178 E

Primary Examiner—Richard R. Stearns

[57] ABSTRACT

An internal diameter measuring and scanning device for pipes, gun barrels and the like, wherein the arrangement is slidably axially movable through the pipe. The arrangement includes a guide body which is rotatably mounted in the pipe. A plurality of feeler fingers are mounted on the guide body and are outwardly biased so as to contact the internal wall surface of the pipe. The feeler fingers are operatively connected to stretch measuring strips which are adapted to emit electrical pulses in accordance with the measurements carried out by the feeler fingers. The electrical pulses are processed in a processing and evaluation unit. A measuring sled is connected to the guide body and is centered in the pipe by leaf springs or brush rings. A step-motor is connected to the guide body to stepwise advance it through the pipe from measuring region to measuring region.

3 Claims, 12 Drawing Figures

INTERNAL DIAMETER MEASURING DEVICE FOR PIPES

BACKGROUND OF THE INVENTION

The invention relates to an internal diameter measuring device for pipes which comprises a guide body slidably movable in the longitudinal direction in the pipe to be measured, which guide body is rotatable about the pipe axis. The device includes a plurality of feeler members or fingers which project past the exterior periphey of the guide body and which resiliently abut against the internal wall surface of the pipe to be measured. The feelers are adapted to transmit measuring values to an evaluating unit which amplifies the values and transmits them further.

A device of this type is known and is for example described in the German utility model No. 7,502,220. Such device serves preferably for carrying out tolerance measurements in the bores of machine tools. Such devices are not suitable for measuring diameters of long pipes, since the device only can be manually manipulated by means of a handle and the measurement evaluation unit is solely provided with a scale of an indicating device. Measurements carried out with this type of a device are quite time consuming. An automatized measurement and evaluation of the measured values is not possible with a device of this type. Furthermore, in view of the minimum size that is mandated by the construction of this type of device, the feelers thereof can carry out only the measurements of the internal wall of a pipe at points spaced a considerable distance from each other and therefore small openings or depressions in the internal wall surface of the pipe, for example so-called washed-out areas in gun barrels cannot be measured at all with this type of a device.

SUMMARY OF THE INVENTION

It is an object of this invention to measure worn surface areas and washed-out areas in gun barrels, fully automatically, error-free, whereby a complete measurement of the entire internal wall surface of a pipe is carried out in a relatively short period of time. A fully automatic pipe measurement can be carried out in accordance with a stored program for purposes of determining the condition of the pipe and to render a forecast concerning the hit probability and load capacity of the pipe or gun barrel.

The objects of the invention are achieved in that the measuring device of the afore-described type includes as a guide body a measuring sled provided with adapting rings contacting the internal wall of the to be measured pipe, whereby the measuring sled is moved by way of a step drive in the longitudinal direction of the pipe and via a rotary drive is also slidably movable in the peripheral direction of the pipe from measuring position to measuring position. The sliding displacement can be carried out automatically and there can be furnished for the measurement evaluation emitter an electronic measuring data processing unit and a registration unit, so that shortly after termination of the measurement, the result of the measurement can be obtained because it is only dependent on the operation of the data processing arrangement.

In accordance with one embodiment of the invention a measuring sled includes a part connected to a step-drive device, which is only slidably displaceable in the longitudinal direction of the pipe, but which is, however, fixable by way of clamping jaws in a preselected position in the pipe. Moreover, in this embodiment the rotary drive forms part of the measuring sled, such unit being rotatable and longitudinally movable in the pipe. By means of this separation of the parts forming the measuring sled, each part of which is mounted in the pipe and is provided with its own adapting rings, disturbing influences affecting the measurement, which can be transmitted from the parts on which the drives are mounted, and not transmitted to the feeler fingers are avoided. A complete separation, in accordance with a further feature of the invention, is attained in that a support for the step-drive is provided, which can be mounted against the internal walls of the pipe by means of adapting rings, and which is slidably movable in the longitudinal direction and is provided with clamping jaws which fix it in a preselected position in the pipe. The connection of this support with the measuring sled can be effected preferably then via a toothed gear rack which is slidable in the longitudinal pipe axis direction via a transport bevel gear of the step-drive mounted in this support. Thereby, a measuring porcess is possible in such a way that, after fixing the measuring sled by means of clamping jaws in the pipe, the support moves first up to the outer free end of the toothed rack, thereafter the clamping jaws of the support fix it in position, then the clamping jaws of the measuring sled are released, and then during measuring the measuring sled is stepwise pulled towards the support. In order to protect the feelers against damage during the slidable introduction into the pipe and also during slidable displacement in the pipe between measuring times, there is, in accordance with this invention, provided a protective cover adapted to be moved over the feeler fingers by means of an advancing drive which cover is slidably mounted on the rotary part of the measuring sled.

In order to centrally positionally maintain the measuring sled and support also in pipes having deeper interior depressions and openings, in which the measuring clamps could protrude, there is, in accordance with the invention, each clamping jaw provided with an inwardly directed bolt, which is inwardly biased by means of a spring, the inner free end of which bears against a cone, mounted on a ball joint, which is axially slidably in the longitudinal direction of the measurring sled, respectively the support. The cone is maintained in its position by means of a stroke rod.

By mounting the cone on a spherical surface the cone is swingably supported thereon and is displaced from the axial direction in accordance as to how far the bolts are pressed outwardly. Thereby a self-centering of the bolt is attained and the contact pressure onto the clamping jaw always remains the same.

In order for the pipe to be measured over its entire length, there is, in accordance with the invention, provided a starting pipe at each end of the measured pipe, which has the same internal diameter as the to be measured pipe. During measuring in the region of one pipe end the arrangement is then moved into the starting pipe. This starting pipe can also be formed as a guide jacket which can be slid over the pipe end. In case the interior of a pipe is to be scanned which expands at one location and which has an adjoining expanded space, that is, for example, a gun barrel and the conical transfer zone at the loading chamber of the gun barrel, the starting pipe can have an external diameter which corresponds to that of the expanded space and this starting pipe can be maintained in it at a distance from the to be measured pipe proper. Thereby it is also possible to measure the expanded pipe. In such a case the measuring sled is mounted with one end in the starting pipe and with the other end is already maintained in position in the to be measured pipe with its adapting rings.

In order to control the functioning of the arrangement during the measuring process, there are provided a number of contact switches between both ends of the toothed rack and the support on the toothed rack, respectively on the support. It is also possible to provide a contact switch on the support or at the free end of the toothed rack, which when contacted, coacts with the front starting pipe arranged as a pipe extension. Further contact switches can be provided in the rotary or longitudinally slidable part of the measuring sled.

In order to minimize the number of measuring steps, there is provided a particularly space-saving arrangement for the feeler fingers. The feeler fingers are, in accordance with the invention, swingably mounted in longitudinal slits of a drum of a guide body, for example, the measuring sled; said switching movement being unilateral; moreover, they are formed as narrow brackets, each of which ends outwardly into a feeler tip and is, at its rear side connected with a stretch measuring strip armed with a sheet metal leaf. In accordance with the resistance of the stretch measuring strip, there can be calculated the depth of the penetration of the feeler finger into a depression of the interior wall of the pipe, in dependence with the spring load, in an evaluation unit. In such a space-saving arrangement there can be mounted 90 brackets with feeler rods around the periphery of the drum. When measurements of the interior of a pipe is carried out at various locations of the measuring positions, which are spaced from each other only 1 mm in the longitudinal and peripheral direction, the measuring process can be carried out in such a way that first the measuring sled is moved in the longitudinal direction to a measuring region, it is then rotated about a predetermined angle, it is then returned to the original measuring position, and the measuring distance between measuring positions is retraversed several times, respectively, after the rotation of the feeler about a programmed angle. The programmed traversing of the measuring region and the advancing from measuring region to measuring region can be carried out automatically.

In order to make the measurements independent from stresses that may occur, for example, the hooking or jamming of the bracket in the pipe, there are arranged, in accordance with a further feature of the invention, connecting rods between each bracket and each spring leaf. Thereby it is possible to determine, by means of the stretch measuring strip, via the bending stress of the spring leaf only, the respective depth of the opening, furrow or depression in the pipe wall. Even when the bracket hooks into an opening, it is placed under tension, or is twisted into an opening. In case a bracket breaks, it can be easily and rapidly replaced by a new bracket. When a bracket breaks, no measuring signal is released. The spring leaf and the stretch measuring strip are not contacted thereby, since they are protectively disposed in the drum. They can continue to be used.

The object as described hereinabove can also be obtained in an alternate form of the invention in which a measuring device of the afore-described type is provided with a measuring sled coacting with a centering arrangement mounted on the inner wall of the to be measured pipe, which consists of a pipe-shaped outer protective housing which supports the centering device and an inner housing which is practically play-free, is longitudinally slidably guided, supports the feeler fingers, and represents a guide body. This inner protective housing can be made to extend past both end regions of the to be measured pipe. The inner housing is slidably movable from measuring position to measuring position by means of oppositely actuating rotary field motors armed with cables which are wound on cable drums.

This unitary guide body has the advantage, that the measurement can be carried out by means of a one time traversing of the to be measured pipe from the load chamber side to the muzzle. The cable-rotary field motor-advancing drive provided with this embodiment furnishes a sufficient measuring preciseness during continuous, slow advancing of the arrangement by means of 90 to 100 measuring feeler fingers mounted about the periphery of the inner cover. Thus, it has been found advantageous that an eventual disturbing spot, for example an erosion furrow in the inner pipe wall surface, can be measured in its axial and tangential extent as well in its depth in a particularly precise manner (length $\pm 1$ mm, breadth: $\pm 2$ mm and depth: $\pm 1.2$ mm), whereas it suffices to measure the distance to the pipe mouth by means of a precision of $\pm 3$ mm. The particularly important measurement of the erosion depth is facilitated in that at least one measuring feeler finger which abuts against the erosion furrow flank, in view of its spring tensioning, has the tendency to bent laterally a fraction of a millimeter, so that at all times the deepest point of the erosion furrow is felt or scanned, and also then, when prior thereto, the measuring feeler finger has not completely precisely been pulled over the deepest point of the eroded surface. Therefore, an undesirable rotation of the guide body for the measurement is dispensed with, because during a repetition measurement the position of greatest pipe damage is again in all cases found, eventually along an other measuring path. A correlation of the measuring path with the normal plane through the pipe bore axis is, when required, made possible by means of a water level bubble, clinometer or the like arrangement, mounted on the inner housing, the signals of which are registered simultaneously with the other measuring values. For the centering of the guide body, it is sufficient, in accordance with this embodiment of the invention, to provide at least two brush members axially spaced from each other on the exterior of the protective housing, continuous or interrupted in the peripheral direction. These brush members consist of at least three brush rings with stepped differentiated outer diameters, the smallest of which is smaller than the other brush rings but larger than the caliber diameter of the to be measured pipe and the step height of which is smaller than the measuring depth tolerance.

This brush centering arrangement has the advantage, that the brushes do not extend into local indentations of the inner pipe wall, but are spaced therefrom.

With a preferred embodiment of the invention there is attained that, the feeler fingers are automatically driven out of the protective housing during the measuring process and after the measuring process are automatically again introduced into the protective housing. This is attained by having the cable at the rear pipe end, which is paid out by the cable drum of the rotary field motor and is connected to the rear facing end wall of the inner housing, whereas the cable coming from the other rotary field motor is connected at the forward end of the pipe by means of a bolt secured to the forwardly facing end wall of the protective housing, which housing is slidably guided to a forward facing end wall of the inner housing; and a tensioning spring is arranged between the bolt which extends through this forwardly facing end wall of the inner housing and the rear facing end wall of the inner housing.

In order to carry out the measurement up to the pipe mouth, a pot-like starting pipe, which is clamped onto the pipe mouth can be provided in this embodiment, the length of which corresponds to the guide body length during the measuring process. This pot-like starting pipe could also serve as a container for receiving the guide body or for further transporting the guide body to the next to be measured pipe. With the afore-described arrangement, the feeler fingers can be simplified, in accordance with the invention, in that the free end of the feeler fingers bears against the to be measured surface, whereas the other end of the feeler is in contact with a leaf spring secured to the inner housing, which is armed with a stretch measuring strip. During the measuring process the deviations of the feeler fingers are transmitted by the stretch measuring strip as electrical signals to a measurement value emitter. In order to extensively avoid faulty measurements with this type of a feeler finger, due to a bending of the leaf spring, for example when the feeler is caught in an erosion furrow of the to be measured pipe, there can be provided at the backside of the first mentioned leaf spring, that is at the side facing away from the to be measured surface, a second leaf spring, also fixed at its other end to the inner housing, which makes with its free end a point contact with the first leaf spring. If this is the case, then only the second leaf spring is armed with the stretch measuring strip.

With all embodiments of the invention, the stretch measuring strip can be glued onto the leaf spring or can be deposited thereon by evaporation. A doubling of the measuring signal can be attained, in that a stretch measuring strip can be mounted on the upper as well as on the underside of the leaf spring. In order to eliminate the effect of a twisting of the leaf spring, for example when it is caught in an erosion furrow, the stretch measuring strip or strips can be arranged angularly with respect to the longitudinal direction of the leaf spring on the leaf spring itself. The bending of the leaf spring by means of lateral pressures exerted thereon can thereby be minimized, so that there are arranged flat intermediate leaves between the leaf springs extending radially outwardly around the outer periphery of the inner housing.

The afore-mentioned stretch measuring strip can be in the form of a strain gauge or other type of electrical or electronic force measuring device. Such force measuring devices are, for example, disclosed in U.S. Pat. Nos. 2,859,613; 2,814,946 and 2,866,059; also in German published patent application No. 15 73 792 and in the 1951 article by Prof. Dr. Ir. J. J. Koch et al of the special printing of N. V. Phillips Gloelampenfabricken, Eindhoven, The Netherlands, pg. 93 and also in the IBM Technical Disclosure Bulletin entitled "Precision Measurements" by W. A. Picker and H. Wenzel, Vol. 12, No. 12, May 1970.

The leaf spring can be a spring sheet metal member. These members can be clamped on the guide body, the pipe-shaped measuring sled or the inner housing, or can be secured thereon in any suitable manner. Moreover, they can be formed as integral projections made out of the same material then the measuring sled itself or the inner housing and can be bent outwardly therefrom.

The application of the afore-described feeler member or finger is not limited to the afore-described embodiments of guide bodies. Such feeler members or fingers can, in accordance with the invention, be generally used as path scanners for length measuring devices, for example, as a measuring tongue for measuring the inner diameter of bores of tools.

BRIEF DESCRIPTION OF THE DRAWINGS

In order that the invention may be more readily understood, reference will now be made to the accompanying drawings, in which:

FIG. 1 is a side-elevational view, partially in section, of a measuring device in accordance with the invention disposed within a pipe to be measured;

FIG. 1c is a view along line 1—1 of FIG. 1a;

FIGS. 2 and 3 are cross-sectional views, respectively along mutually perpendicular planes relative to each other, illustrating the clamping arrangement for the clamping jaws on the support;

FIGS. 4 and 5 are cross-sectional views of the feeler finger mounting arrangements showing a feeler finger in different operative positions;

FIG. 6 is a schematic sectional view through the drum in the region of the mounting of the feeler fingers;

FIG. 7 illustrates in detail in cross-section the mounting arrangement for the sheet metal springs, FIG. 8 illustrates schematically the centering arrangement with brushes; and FIG. 9 illustrates in cross-section the construction of the guide body.

DESCRIPTION OF PREFERRED EMBODIMENTS

Figure 1:
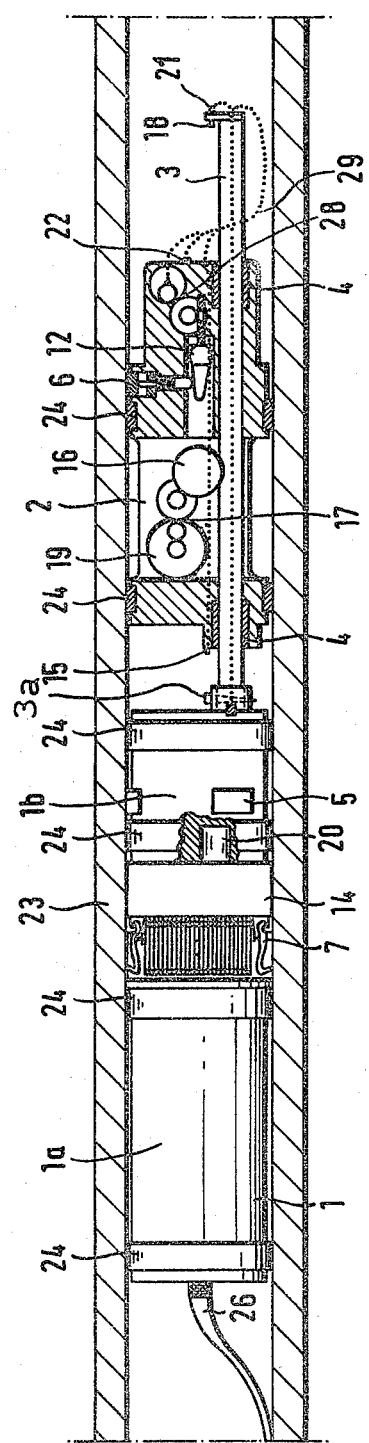
FIGS. 1-6 illustrate a first embodiment of the invention.
Figure 1A:
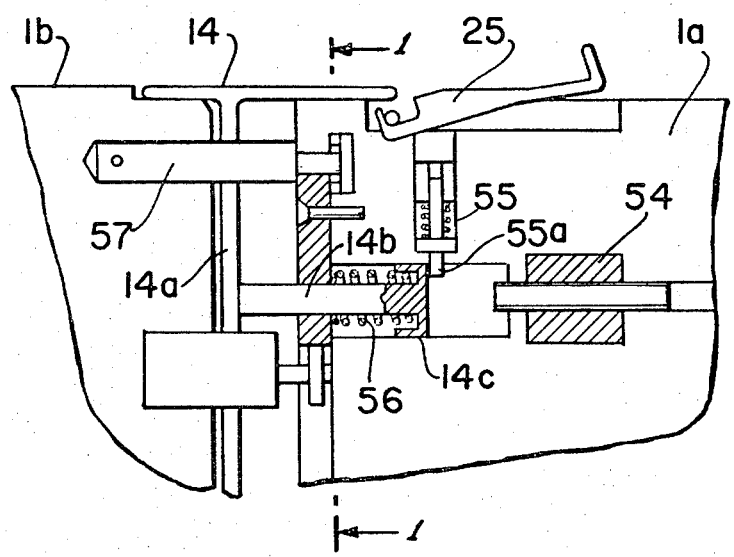
FIG. 1a is a schematic view illustrating the mechanism for moving the protective cover 14.
Figure 1C:
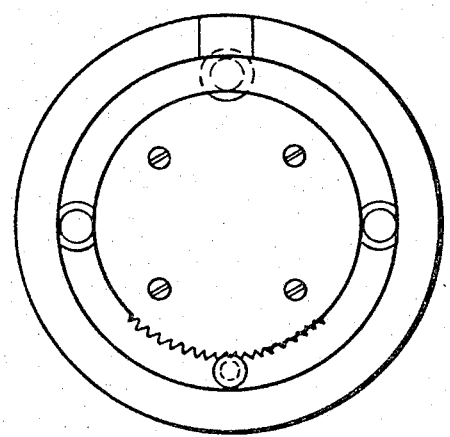
Figure 1B:
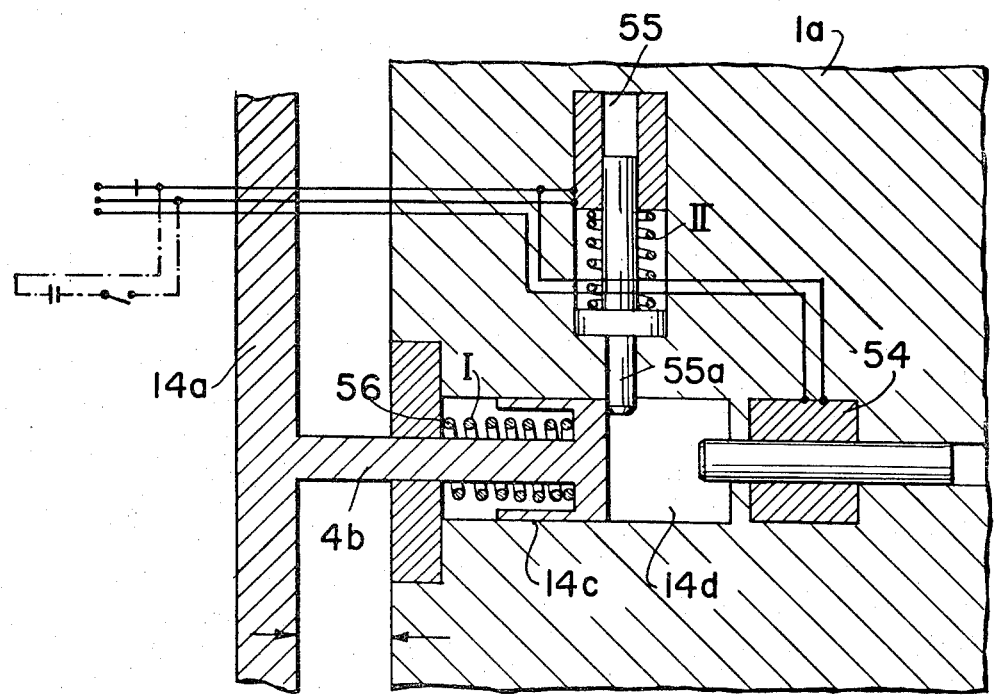
FIG. 1b is a detailed schematic view of the mechanism illustrated in FIG. 1a at an enlarged scale.

Referring to the drawings there is illustrated in FIG. 1 the pipe 23 the internal wall surface of which is to be scanned and measured by means of the measuring device of this invention. The measuring sled 1 is provided with a rotary part 1a and a longitudinally slidable part 1b as well as with a support 2 and is mounted in the pipe 23 by way of the adapting rings 24. Both the rotary part 1a and longitudinally slidable part 1b are connected to the support 2 by means of a hollow toothed rack 3 mounted in the rotary moment ball boxes 4 in the support 2. The toothed rack 3 has a rectangularly shaped end which provides the connection, and which is inserted in the measuring sled and secured therein by means of a wedge 3a. Thereby the control cable 29 is automatically secured to the longitudinally slidable part 1b, said cable 29 extends through the toothed hollow rack 3 for the support 2 up to the measuring sled 1. By means of biasing the clamping jaws 5 the measuring sled 1 can be fixed in its position in the pipe 23, whereas by means of biasing the clamping jaws 6 the support 2 can be fixed therein. The feeler fingers 7 are mounted on the rotary part 1a of the measuring sled 1, which part 1a can be rotated by means of the rotary drive 20. The feeler fingers 7 may be covered by means of a protective cover 14 which can be slid thereon by a displacement arrangement as illustrated in FIGS. 1a, 1b, 1c. The contacts for safety and control functions are designated with the references numbers 15, 18, 21, and 22. A transport bevel gear wheel 16 is driven by means of a step drive 19 via a gear train 17. A displacement arrangement 28 serves to push forward the cone 12 to bias the clamping jaws 6.

Figure 2:
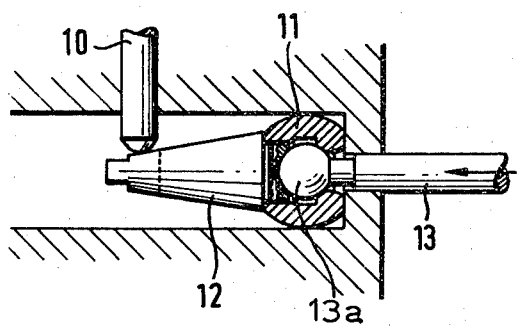
Figure 3:
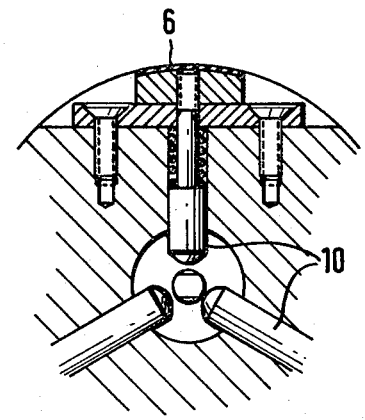

As is illustrated in FIGS. 2 and 3 the bolts 10, which extend inwardly from three clamping jaws 6, are in contact with the cone 12, which is held in position by means of the spherical body 11. A sphere or ball 13a extends into the cavity of the spherical body 11, which ball 13a forms an extension of the stroking rod 13, which forms part of a displacement device 28 mounted in the support 2 and which is maintained in position by it.

Figure 4:
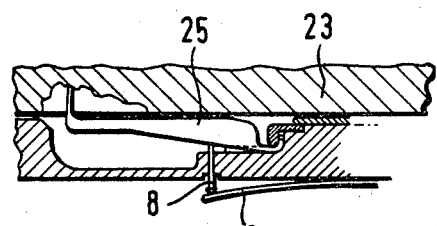
Figure 5:
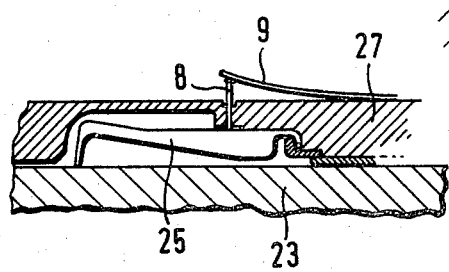
Figure 6:
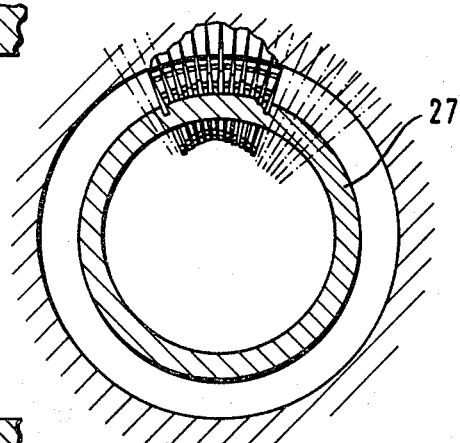

In accordance with FIGS. 4 to 6, there are mounted around the periphery of the drum 27 ninety feeler fingers 7, each having a strap 25. Each finger 7 is connected by way of a pin 8 to the sheet metal leaf formed as leaf spring 9. As can be noted from FIG. 1, the drum 27 is coaxially connected to the rotary part 1a.

The measuring process can be carried out automatically by means of a stored program. After introducing the drive at one end of the pipe into the pipe 23 up to an abutment in the starting pipe, and after driving up of the support 2 against the measuring sled 1, the limit position of which is indicated by means of a contact switch 15, the measuring device is ready to operate. It now commences its operation automatically in accordance with a program and scans and measures the interior wall surface of the pipe. First the clamping jaws 5 of the measuring sled 1 are biased outwardly. Then the support 2 is moved towards the right by means of the bevel gear wheel 16 up to the contact 18. Thereafter, the clamping jaws 6 of the support 2 are biased outwardly and the clamping jaws 5 of the measuring sled 1 are released and the protective cover 14 is moved towards the right, so that the feeler fingers are exposed and come into contact with the inner wall surface of the pipe. Thereafter the first measurement takes place. Thereafter the measuring sled is stepwise pulled toward the right via the toothed rack 3 at one millimeter distances, until it again comes into contact with the contact switch 15 of the support 2. After each step the ninety measuring feeler fingers 7 are interrogated by a conventional processing unit and the measuring values are stored in a conventional evaluation unit.

In order to traverse the same measuring region after rotation of the feeler fingers 7 about a preprogrammed angle, the protective cover 14 is slid over the feeler fingers 7 during the return movement of the measuring sled 1 by means of the non-illustrated advancing mechanism. The rotary part 1a of the measuring sled 1 is then rotated about the programmed angle by means of the rotary drive 20. The measuring sled 1 is again returned to its starting position, if necessary after the respective rotation of the feeler fingers 7 several times thereafter. Thereafter, after releasing the clamping jaws 6 of the support 2 and after biasing automatically the clamping jaws 5 of the measuring sled 1, the arrangement can be moved to the next measuring region. All of the electrical pulses for the programs as well as the electrical supply current for the motors and for biasing and releasing the clamping jaws is supplied via the measuring and control cable 26; on the other hand, the pulses of the measuring values are conducted to the evaluation unit via the same cable 26.

The respective position of the support 2, respectively the measuring sled 1, is indicated on the data processing unit by means of the number of measuring steps. The contact switches are integrated into the measuring program and control the various functional steps, for example, in the following manner:

The contact switch 21, which is mounted exteriorally on the free end of the toothed rack 3, respectively the contact switch 22 mounted at the right exterior end surface of the support 2, terminate the measuring process. The contact switch 18 mounted also at the right free end of the toothed rack 3 but facing towards the left, terminates the movement of the support 2. The contact switch 15, mounted at the left face of the support 2, terminates the movement of the measuring sled 1 after it has traversed a measuring region.

Furthermore, a non-illustrated contact switch, mounted in part 1b of the measuring sled, prevents a measurement to occur, when the protective cover 14 for the feeler fingers 7, does not close an electrical circuit by means of this non-illustrated contact switch, and thereby indicates that the feeler fingers 7 are still in a released condition. A further, non-illustrated contact switch mounted in the part 1a of the measuring sled does not permit a return sliding of the measuring sled, when the protective cover 14 for the feeler fingers 7 does not close a circuit and thereby indicates that the contact feelers 7 are not protected by the cover 14.

The proective cover 14 is slidably guided by way of a plate 14a connected thereto on one or more bolts 57 which extend through mating bores in the plate 14a. The plate 14a is furthermore provided with an axially extending pin 14b having a piston head 14c which is slidably disposed in an axial bore 14d in the part 1b. A coil spring 56 surrounds the pin 14b and one end thereof abuts against one end plate. The other end abuts against the piston head 14c and urges it to the right as seen in FIGS. 1a and 1b. The pin 14b is maintained in position as illustrated in FIG. 1b (the operative position in which it is spaced from the straps 25) by a transverse pin 55a mounted in a transverse bore 55 which can be electrically retracted to release the pin 14b which is then urged against the electromagnet 54 which is maintained in a non-retracted position.

Prior to each measurement there is also effected an automatic compensation of all stretch measuring strips, by means of which the processing unit which supplies the information to the evaluation unit for evaluating the measurement. Thereby a straight line between the outermost points of the feeler fingers 7 when they are in an inwardly pivoted or outwardly pivoted condition is maintained. After the measurement there results an automatic control compensation in the same manner. Thereby all measurements having a deviating output, for example a condition which is brought about by a broken strap 25, are annulled. A separate compensation of a stretch measuring strip of a new strap 25 is therefore not required.

In an alternate embodiment a plurality of brush members are mounted in the to be measured pipe 23 and are spaced from each other. These brush members consist of brush ring 35, 36, 37 which maintain a protective cover 30 centrally within the pipe 23. At the end wall surface 38 of an inner cover 31 there is mounted, on the one hand, the spring leaf 9, which makes a point contact with a spring leaf 46. There is mounted on the spring leaf 46 a stretch measuring strip 45, which is provided with conduits 45a. The eroded regions of the inner wall surface of the pipe 23 or the eroded furrows on the inner pipe wall surface of the pipe 23 are indicated with the reference number 47.

Figure 8:
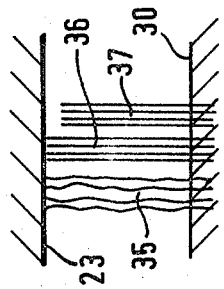

FIG. 8 illustrates the brush ring 35 which may consist of steel springs and indicates how this brush ring provides a centering support for the cover 30.

Figure 9:
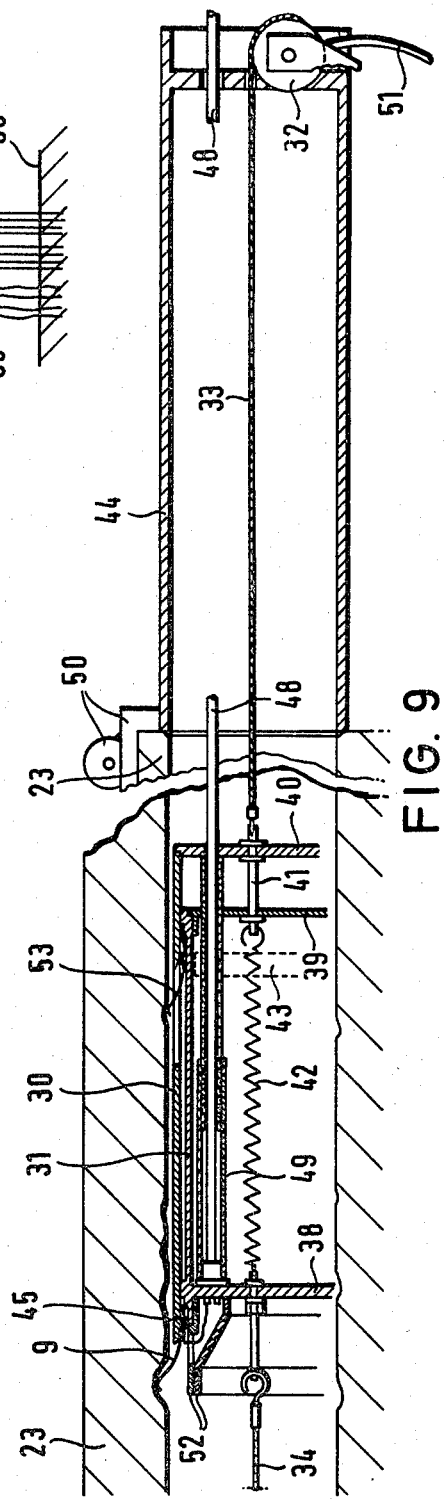

FIG. 9 illustrates about 100 spring leaves 9, provided with stretch measuring strips 45, as arranged about the periphery of the inner cover 31. The inner cover 31 has a rear end wall 38 and a front end wall 39. It slides within the protective cover 30 which is provided with a front end wall 40. At the muzzle of the gun barrel 23, that is at its forward end, i.e. at the right end of the pipe 23 in the drawing, the starting pipe 44 is connected with the clamping arrangement 50 to the muzzle of the gun barrel. At the right outer end of the starting pipe 44 there is disposed the rotating field motor 32 including a cable drum, which by way of the cable 33 is connected to the bolt 41.

A non-illustrated rotary field motor is mounted at the other side of the arrangement and is connected with the cable 34. This cable 34 is connected with the end wall 38 of the inner cover 31. The end wall 38 is connected to bolt 41, which extends rearwardly through the wall 39, by way of a coil spring 42. During the measuring process, that is when the cable 33 is pulled towards the right, the pulling force of the cable 34 is so adjusted, that the inner cover 31 with the feeler elements 9 automatically moves out of the protective cover 30. At the end of the measuring process the coil spring 42 pulls the inner cover 31 again into the protective cover 30. The conduits 45a for the stretch measuring strips 45 lead to a measuring cable 48 via a channel formed by a protective pipe 49 which is disposed between the ring plates 52. This protective pipe 49 extends towards the right outwardly through an end wall of the starter pipe 44. A water bubble level indicator or clinometer is designated with the reference number 43 and serves to indicate the position of the inner cover 31 in the pipe 23. A spring arrangement 53 can be used in lieu of the centering arrangement illustrated in FIG. 8 for axially maintaining the cover 30 in position in the pipe 23. 51 indicates the electrical supply cable for conducting the supply current to the rotary field motor 32.

The inner cover 31 is rotatably mounted about its axis in the pipe 23 so that measurements can be carried out at different angular positions of the measuring device in the pipe 23.

Figure 7:
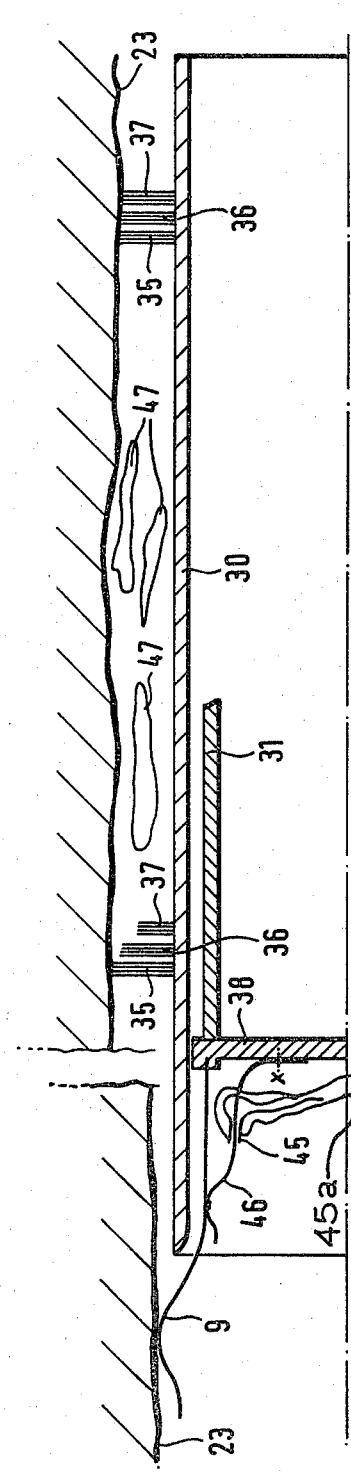
FIGS. 7 to 9 illustrate in vertical cross-section various individual features of a second embodiment of the new measuring device of the invention.

The embodiment of FIGS. 7 to 9 is only intended to be initially rotated, during introduction of the protective cover 30 into the pipe 23, to ease its introduction. During measurements, however, the arrangement is not rotated and therefore the arrangement does not include means for rotating it inside the pipe.

The embodiment of FIGS. 7 to 9 is suitable to carry out rough measurements, that is measurements which are not carried out millimeter per millimeter, but simply as many multiple measurements about the periphery of the pipe as there are spring leaves 9 in the embodiment of FIG. 7. This can be up to 100 spring leaves so that, for example, measurements spaced 4 mm from each other are possible which is most of the time adequate.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. An improved internal diameter measuring arrangement for pipes, gun barrels and the like, wherein the arrangement is slidably axially movable through the bore of the pipe, gun barrel or the like, the improvement comprising in combination the following features:
   (a) a measuring sled axially slidably movable along the bore walls of the to be measured pipe;
   (b) said measuring sled includes first clamping jaw means and is adapted to be fixedly mounted in said pipe by means of said first clamping jaw means;
   (c) said measuring sled further including a portion operatively coaxially connected thereto which is rotatable relative to the measuring sled;
   (d) in that portion of said measuring sled which is non-rotatably mounted in said pipe there is operatively mounted means for rotating said rotatable portion of said measuring sled about the pipe axis;
   (e) said rotatable portion of said measuring sled having a plurality of feeler fingers operatively mounted thereon which extend past the outer periphery of said rotatable portion of said measuring sled and which are biased against the bore walls of the pipe; said feeler fingers being operatively connected to electrical pulse emitting means which are adapted to emit electrical pulses representative of the measurements carried out by the feeler fingers and transmit such pulses to an evaluation unit;
   (f) the measuring sled is connected via a toothed rack to a support which is fixable within said pipe and is adapted to be axially moved therethrough, said fixable support includes adapting ring means coaxially mounted thereon for slidably supporting said support within the pipe;
   (g) the support further includes second clamping jaw means operatively mounted thereon and adapted to be biased outwardly for fixing said support in a predetermined position in the pipe; and
   (h) the support includes a step motor which is operatively connected via gear means to said toothed rack in such a way that when said first clamping jaws of said measuring sled are biased against the bore walls and said second clamping jaw means of said support are not biased thereagainst the support is adapted to be axially reciprocally moved through said pipe, whereas when said first clamping jaws of said measuring sled are not biased against the bore walls of the pipe and said second clamping jaws of the support are biased thereagainst, the measuring sled is adapted to be axially reciprocally moved through said pipe.

2. The improvement of an internal diameter measuring arrangement as set forth in claim 1, wherein at least one of said first and second clamping jaw means comprises an internal wall contacting portion, a bolt connected to said contacting portion and being radially movable, a coil spring mounted on said bolt and biasing it radially inwardly, a cone axially movably mounted in an axial bore, the inner free end of said bolt being in contact with said cone, said cone having a hollow spherical end portion forming a ball joint with a ball mounted therein, a longitudinally movable rod connected to said ball.

3. The improvement of an internal diameter measuring arrangement as set forth in claim 1, including a starting pipe clamped onto the mouth of the pipe to be measured, the length of said starting pipe corresponding to the length of said guide body during the measuring process.

* * * * *